US012699436B2

(12) United States Patent
Tagami et al.

(10) Patent No.: US 12,699,436 B2
(45) Date of Patent: Aug. 4, 2026

(54) INFORMATION PROCESSING APPARATUS AND CONTROL METHOD

(71) Applicant: Lenovo (Singapore) Pte. Ltd., Singapore (SG)

(72) Inventors: Yuta Tagami, Kanagawa (JP); Yoshihiro Takase, Kanagawa (JP); Yuichiro Seto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 75 days.

(21) Appl. No.: 18/783,392

(22) Filed: Jul. 24, 2024

(65) Prior Publication Data

US 2025/0053223 A1 Feb. 13, 2025

(30) Foreign Application Priority Data

Aug. 7, 2023 (JP) ................................. 2023-128603

(51) Int. Cl.
G06F 1/3287 (2019.01)
H02J 1/08 (2026.01)

(52) U.S. Cl.
CPC ............ *G06F 1/3287* (2013.01); *H02J 1/084* (2020.01)

(58) Field of Classification Search
CPC ........ G06F 1/3287; G06F 1/266; G06F 1/263; G06F 1/3234; H02J 1/084
See application file for complete search history.

(56) References Cited

U.S. PATENT DOCUMENTS

2016/0054786 A1* 2/2016 Chenault ............. G06F 13/4022
710/313
2020/0409443 A1* 12/2020 Seto ...................... G06F 1/3287
2021/0089416 A1* 3/2021 Katayama .......... G06F 11/2284
2021/0124411 A1* 4/2021 Tagami ................. G06F 1/3296

FOREIGN PATENT DOCUMENTS

JP 2011-014042 A 1/2011
JP 2014-109829 A 6/2014
JP 2021-071755 A 5/2021

* cited by examiner

*Primary Examiner* — Michael Alsip
(74) *Attorney, Agent, or Firm* — Osha Bergman Watanabe & Burton LLP

(57) ABSTRACT

An information processing apparatus including a plurality of components, includes: a power circuit unit capable of switching between supplying and stopping operating power to the plurality of components; a first component of the plurality of components, the first component being related to external power supply, and being supplied with operating power directly from the power circuit unit; a second component of the plurality of components, the second component being not related to the external power supply; a switch unit connected between the power circuit unit and the second component, the switch unit being capable of switching between supplying and stopping the operating power supplied from the power circuit unit to the second component; and a sub-controller that is operable with power supply to a main controller stopped, the main controller executing information processing based on an operating system (OS).

6 Claims, 4 Drawing Sheets

| CONTROL SIGNAL | NORMAL SHUTDOWN | ECO SHUTDOWN | Moff STATE |
|---|---|---|---|
| S1 | ON | ON | OFF |
| S2 | ON | OFF | OFF |

FIG. 3

| COMPONENTS | NORMAL SHUTDOWN | ECO SHUTDOWN |
|---|---|---|
| SoC UNIT | ON | OFF |
| WLAN CARD | ON | OFF |
| AUDIO SYSTEM | ON | OFF |
| TPM | ON | OFF |
| SENSOR UNIT | ON | OFF |
| USBType-A CHARGER | ON | ON |
| USBPD CONTROLLER | ON | ON |
| TBTRetimer | ON | ON |

FIG. 4

| ADDITIONAL FUNCTIONS | NORMAL SHUTDOWN | ECO SHUTDOWN |
|---|---|---|
| ME FUNCTION (M3 STATE) | ALLOWED TO USE | NOT ALLOWED TO USE |
| RTC TIMER WAKE | ALLOWED TO USE | NOT ALLOWED TO USE |
| ACPI TIMER WAKE | ALLOWED TO USE | NOT ALLOWED TO USE |
| USB WAKE | ALLOWED TO USE | NOT ALLOWED TO USE |
| WAKE BY LAN | ALLOWED TO USE | NOT ALLOWED TO USE |
| WAKE BY WLAN | ALLOWED TO USE | NOT ALLOWED TO USE |
| WAKE BY EC | ALLOWED TO USE | ALLOWED TO USE |
| CHARGE VIA USB PORT | ALLOWED TO USE | ALLOWED TO USE |

FIG. 5

INFORMATION PROCESSING APPARATUS AND CONTROL METHOD

CROSS-REFERENCE TO RELATED APPLICATIONS

This application claims priority to Japanese Patent Application No. 2023-128603 filed on Aug. 7, 2023, the contents of which are hereby incorporated herein by reference in their entirety.

TECHNICAL FIELD

The present invention relates to an information processing apparatus and a control method.

BACKGROUND

In recent years, power saving has been required for information processing apparatuses such as laptop personal computers (laptop PCs) from the viewpoint of ESG (Environment, Social, and Governance).

Conventional information processing apparatuses are equipped with an embedded controller (EC), which is a built-in sub-controller different from the main controller, and use the EC to control multiple power supply circuits to realize power-down modes such as shutdown (see, for example, Japanese Unexamined Patent Application Publication No. 2014-109829).

However, it is difficult to apply EnergyStar, which has been widely known as an ESG energy efficiency method, to the conventional information processing apparatuses for further power saving.

SUMMARY

One or more embodiments of the present invention provides an information processing apparatus and a control method enabling power saving.

An information processing apparatus according to one or more embodiments of the present invention includes a plurality of components, and includes: a power circuit unit capable of switching between supplying and stopping operating power to the plurality of components; a first component of the plurality of components, the first component being related to external power supply, and being supplied with operating power directly from the power circuit unit; a second component of the plurality of components, the second component being not related to the external power supply; a switch unit connected between the power circuit unit and the second component, the switch unit being capable of switching between supplying and stopping the operating power supplied from the power circuit unit to the second component; and a sub-controller that is operable with power supply to a main controller stopped, the main controller executing information processing based on an operating system (OS), the sub-controller using a first control signal to execute control of switching between supplying and stopping the operating power supplied from the power circuit unit, and using a second control signal to execute control of switching between supplying and stopping of the operating power via the switch unit.

In the information processing apparatus according to one or more embodiments of the present invention, in a second shutdown state that consumes less power than a first shutdown state that is a normal shutdown state, the sub-controller may stop power supply to the main controller, may use the first control signal to supply the operating power from the power circuit unit to the first component, and may use the second control signal to stop supply of the operating power to the second component via the switch unit.

In the information processing apparatus according to one or more embodiments of the present invention, in the first shutdown state, the sub-controller may stop power supply to the main controller, may use the first control signal to supply the operating power from the power circuit unit to the first component, and may use the second control signal to supply the operating power to the second component via the switch unit.

In the information processing apparatus according to one or more embodiments of the present invention, when transitioning to a shutdown state, the sub-controller may execute control to transition to the first shutdown state if a return event from the shutdown state is set; and may execute control to transition to the second shutdown state if no return event is set.

The information processing apparatus according to one or more embodiments of the present invention may further include a state information storage that stores state information indicating whether the first shutdown state or the second shutdown state is to be executed, in response to a request to transition to a shutdown state, the main controller may make a determination whether the return event is set or not, and may store the state information in the state information storage based on a result of the determination, and the sub-controller may execute control to transition to either the first shutdown state or the second shutdown state in accordance with the state information stored in the state information storage.

In the information processing apparatus according to one or more embodiments of the present invention, the first component may include a component to operate a universal serial bus (USB).

A method for controlling an information processing apparatus according to one or more embodiments of the present invention controls an information processing apparatus including a plurality of components, and including: a power circuit unit capable of switching between supplying and stopping operating power to the plurality of components; a first component of the plurality of components, the first component being related to external power supply, and being supplied with operating power directly from the power circuit unit; a second component of the plurality of components, the second component being not related to the external power supply; a switch unit connected between the power circuit unit and the second component, the switch unit being capable of switching between supplying and stopping the operating power supplied from the power circuit unit to the second component; and a sub-controller that is operable with power supply to a main controller stopped, the main controller executing information processing based on an operating system (OS), the sub-controller using a first control signal to execute control of switching between supplying and stopping the operating power supplied from the power circuit unit, and using a second control signal to execute control of switching between supplying and stopping of the operating power via the switch unit.

One or more embodiments of the present invention save power.

BRIEF DESCRIPTION OF THE DRAWINGS

FIG. 3 indicates one example of control signals in the shutdown states of the laptop PC according to one or more embodiments.

FIG. 4 indicates one example of the states of the components when the laptop PC according to one or more embodiments is shut down.

FIG. 5 indicates one example of the additional functions of the laptop PC in the shutdown states according to one or more embodiments.

DETAILED DESCRIPTION

Figure 1:
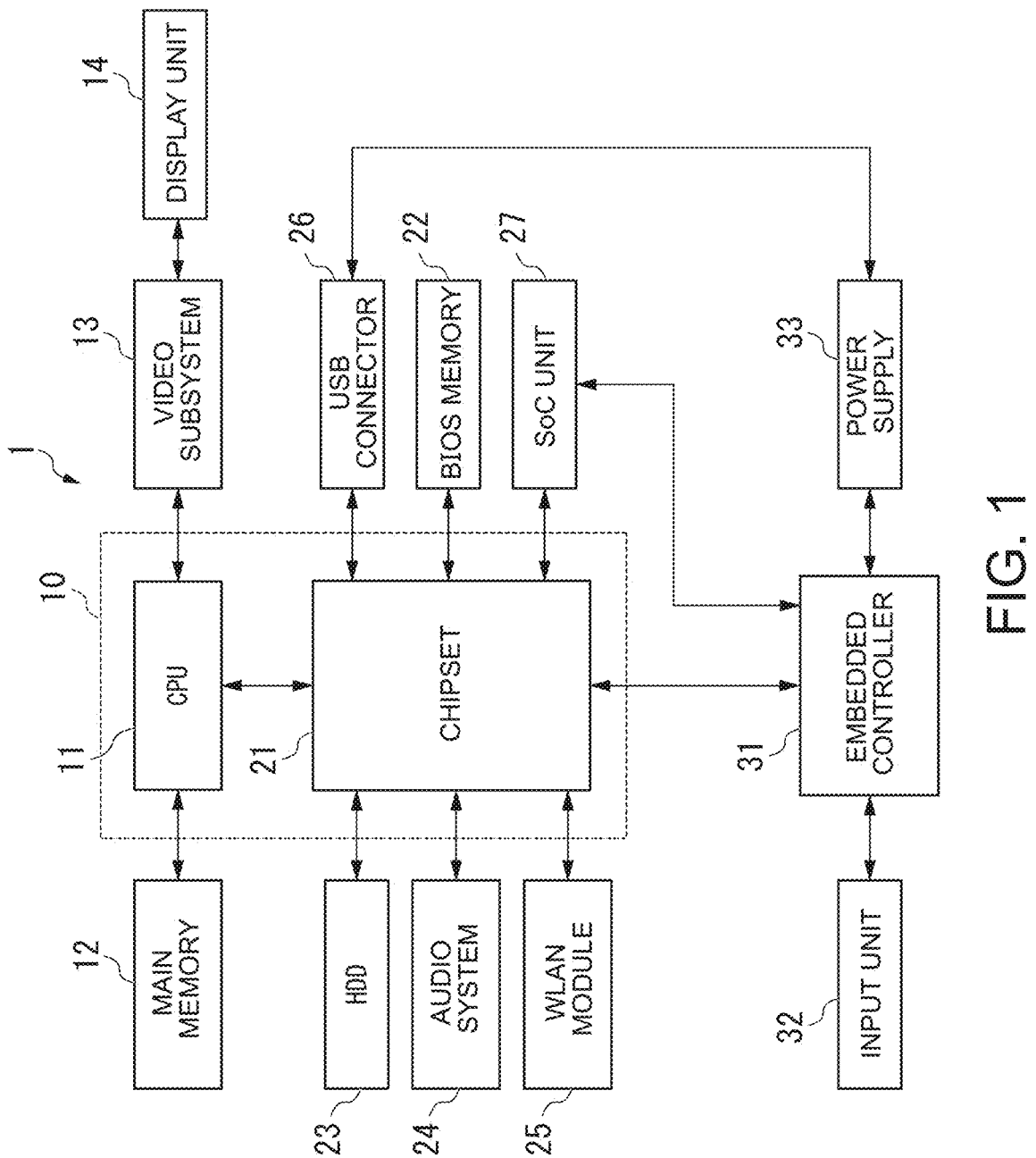
FIG. 1 illustrates one example of a major hardware configuration of a laptop PC according to one or more embodiments.

Referring to the drawings, the following describes an information processing apparatus and a control method according to one or more embodiments of the present invention.

FIG. 1 illustrates one example of a major hardware configuration of a laptop PC 1 according to one or more embodiments.

As illustrated in FIG. 1, the laptop PC 1 (laptop personal computer) includes a CPU 11, a main memory 12, a video subsystem 13, a display unit 14, a chipset 21, a BIOS memory 22, a HDD 23, an audio system 24, a WLAN module 25, a USB connector 26, an SoC unit 27, an embedded controller 31, an input unit 32, and a power supply 33. The following describes embodiments by way of the laptop PC 1 that is one example of the information processing apparatus.

In one or more embodiments, the CPU 11 and chipset 21 correspond to a main controller 10.

In one or more embodiments, the laptop PC 1 will be described as an example of the information processing apparatus.

The central processing unit (CPU) 11 executes various types of arithmetic processing under the control of programs to control the laptop PC 1 as a whole.

The main memory 12 is a writable memory functioning as a read-in area of a program executed by the CPU 11 or a work area to write data processed by the executed program. For instance, the main memory 12 includes a plurality of dynamic random access memory (DRAM) chips. The program executed includes a basic input output system (BIOS), an operating system (OS), various types of drivers to operate peripherals as hardware, various types of service/utility, and application programs.

The video subsystem 13 is to implement the functions related to image displaying, and includes a video controller. This video controller processes a drawing instruction from the CPU 11 and writes the processed drawing information on a video memory. The video controller also reads this drawing information from the video memory and outputs the drawing information as drawing data (display data) to the display unit 14.

The display unit 14 is a liquid crystal display, for example, and displays an image on the screen based on the drawing data (display data) output from the video subsystem 13.

The chipset 21 includes a controller, such as universal serial bus (USB), serial AT attachment (ATA), serial peripheral interface (SPI) bus, peripheral component interconnect (PCI) bus, PCI-Express bus, or low pin count (LPC) bus, and a plurality of devices are connected to the chipset. FIG. 1 illustrates examples of the devices connected to the chipset 21, including the BIOS memory 22, the HDD 23, the audio system 24, the WLAN module 25, the USB connector 26, and the SoC unit 27.

The BIOS memory 22 includes a non-volatile memory that is electrically rewritable, such as an electrically erasable programmable read only memory (EEPROM) or a flash ROM. The BIOS memory 22 stores BIOS and system firmware to control the embedded controller 31, for example.

The hard disk drive (HDD) 23 is one example of a non-volatile memory, and stores an OS, various types of drivers, various types of services/utilities, application programs, and various types of data.

For instance, the audio system 24 is an audio codec, and records, reproduces, and outputs sound data.

The wireless local area network (WLAN) module 25 connects to a network via wireless LAN for data communication. When receiving data from the network, for example, the WLAN module 25 generates an event trigger indicating the data reception, which can be used to wake up (return) the laptop PC 1 from a shutdown state.

The USB connector 26 is for connection to peripheral devices via a universal serial bus (USB). The laptop PC 1 in one or more embodiments has the USB connector 26, including both a Type-A connector and a Type-C connector.

The SoC (System On a Chip) unit 27 is an INTEL SOC, for example, and controls the sleep mode of the main controller 10 as well as controlling timers (e.g., RTC, ACPI). The SoC unit 27 may be a part of the chipset 21.

The embedded controller 31 (an example of the sub-controller) is a one-chip microcomputer to monitor and control various devices (e.g., peripherals and components such as sensors), irrespective of the system state of the laptop PC 1. The embedded controller 31 also has a power-management function to control the power supply 33. The embedded controller 31 includes a CPU, a ROM (e.g., flash ROM), and a RAM not illustrated, and has an A/D input terminal, a D/A output terminal, a timer, and a digital input/output terminal for a plurality of channels. The embedded controller 31 connects with the input unit 32, the power supply 33 and others via these input/output terminals, and the embedded controller 31 controls the operation of these components. The embedded controller 31 is an embedded unit independent of the main controller 10, and is operable while the power supply to the main controller 10 is stopped.

The input unit 32 includes various types of input devices, such as a keyboard, a pointing device, a touch pad, and a power switch (activation switch). In response to pressing of the power switch (activation switch), the input unit 32 allows the laptop PC 1 to return from a shutdown state (restart of the laptop PC 1).

The power supply 33 includes a DC/DC converter, a discharge/charge unit, and a battery unit, and supplies power to operate the laptop PC 1. The power supply 33 converts DC voltage supplied from an external AC/DC adaptor or the battery unit to a plurality of levels of voltage required to operate the laptop PC 1. The power supply 33 supplies power to different parts of the laptop PC 1 under the control of the embedded controller 31. The details of the power supply 33 in one or more embodiments are described later.

In one or more embodiments, the devices that receive power from the power supply 33 are defined as components. In other words, the laptop PC 1 has multiple components.

Figure 2:
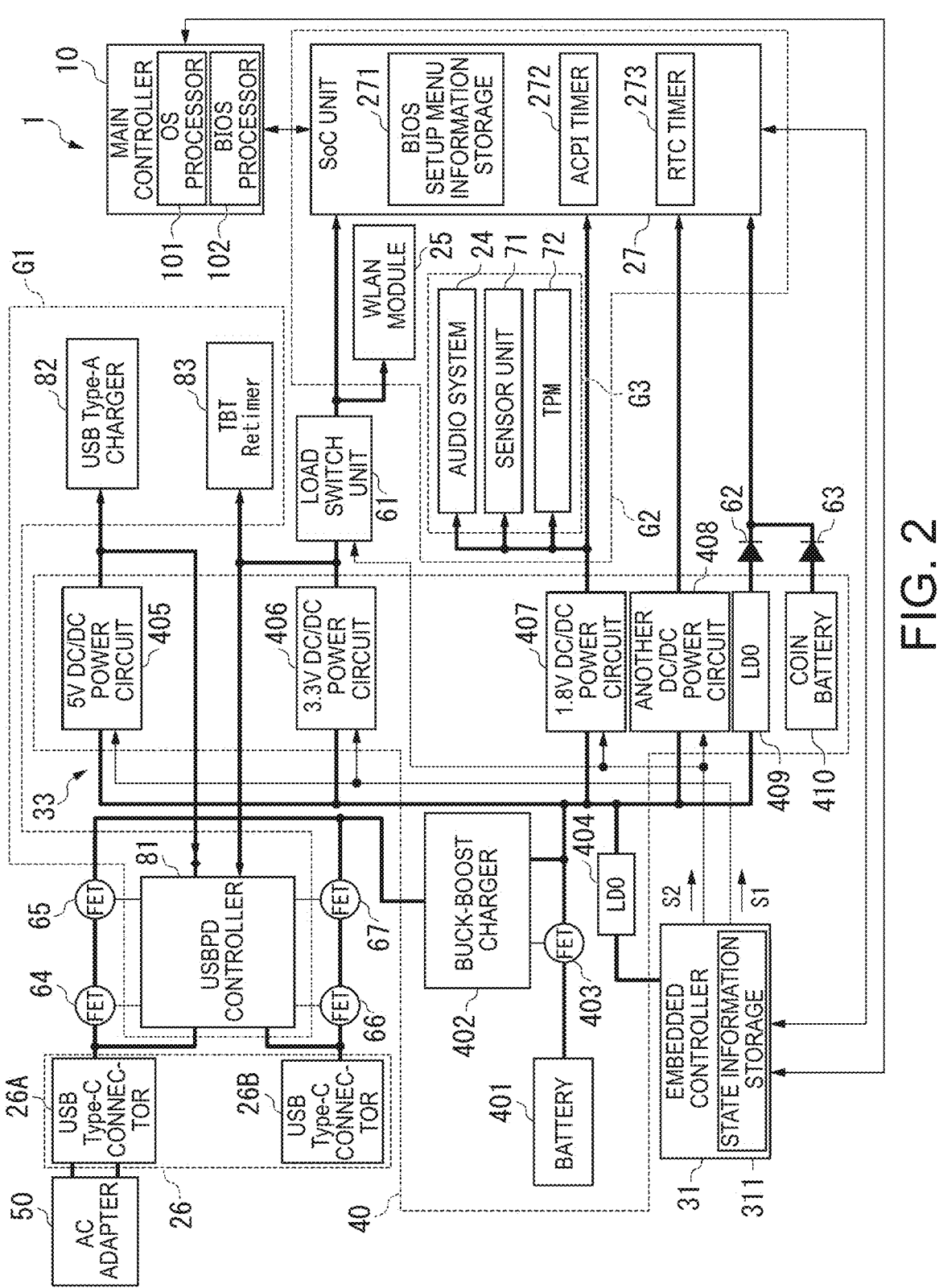
FIG. 2 is a block diagram illustrating one example of the power supply of the laptop PC in details according to one or more embodiments.

Referring next to FIG. 2, the following describes the details of the power supply 33 of the laptop PC 1 according to one or more embodiments.

FIG. 2 is a block diagram illustrating one example of the power supply 33 of the laptop PC 1 in details according to one or more embodiments.

As illustrated in FIG. 2, the laptop PC 1 includes the USB connector 26, components in group G1, components in group G2, the main controller 10, the embedded controller 31, a power circuit unit 40, a load switch unit 61, diodes (62, 63) and FETs (64, 65, 66, 67).

The power circuit unit 40 enables switching between supplying and stopping of the operating power to a plurality of components. The power circuit unit 40 converts the power supplied from an AC adapter 50 connected to the laptop PC 1 via the USB TYPE-C connector 26A of the USB connector 26 into different levels of voltage, and supplies it to a component that corresponds to each level of voltage.

The power circuit unit 40 includes a battery 401, a buck-boost charger 402, a FET 403, LDOs (404, 409), a 5V DC/DC power circuit 405, a 3.3V DC/DC power circuit 406, a 1.8V DC/DC power circuit 407, another DC/DC power circuit 408, and a coin battery 410.

For instance, the battery 401 is a lithium ion battery, and charges with the power supplied from the AC adapter 50. When the AC adapter 50 is not connected to the laptop PC 1, for example, the battery 401 supplies power to different parts of the power supply 33.

The buck-boost charger 402 controls the FET 403 to control charging and discharging of the battery 401. The buck-boost charger 402 also generates power for rapid charging of the battery 401 or a device connected to the USB connector 26, for example, and supplies it during charging.

The field effect transistor (FET) 403 performs switching of the battery 401 between charging and discharging under the control of the buck-boost charger 402.

For instance, the LDO 404 is a low-dropout regulator, and generates operating power (operating voltage) for the embedded controller 31 from the power supplied from the AC adapter 50 or the battery 401.

The 5V DC/DC power circuit 405 generates 5V-operating power from the power supplied from the AC adapter 50 or battery 401.

The 3.3V DC/DC power circuit 406 generates 3.3V-operating power from the power supplied from the AC adapter 50 or battery 401.

The 1.8V DC/DC power circuit 407 generates 1.8V-operating power from the power supplied from the AC adapter 50 or battery 401.

The other DC/DC power circuit 408 generates operating power of another voltage from the power supplied from the AC adapter 50 or battery 401.

Receiving a control signal S1, the 5V DC/DC power circuit 405 and 3.3V DC/DC power circuit 406 are capable of switching between supplying and stopping the operating power to the components.

Receiving a control signal S1, the 1.8V DC/DC power circuit 407 and other DC/DC power circuit 408 are capable of switching between supplying and stopping the operating power to the components.

For instance, the LDO 409 is a low-dropout regulator, and generates operating power (operating voltage) for the RTC timer 273 of the SoC unit 27 from the power supplied from the AC adapter 50 or the battery 401.

For instance, the coin battery 410 is a coin-shaped lithium battery that supplies operating power (operating voltage) for the RTC timer 273 of the SoC unit 27.

The components in group G1 (first component) are a first group of components among the multiple components, and are related to the external power supply and are supplied with operating power directly from the power circuit unit 40. For instance, Group G1 components include components to operate USB.

For instance, the group G1 components include a USBPD controller 81, a USB Type-A charger 82, and a TBT Retimer 83.

For instance, the USBPD controller 81 is a controller IC that complies with the USB Type-C Power Delivery standard, and negotiates power supply with a device connected to the USB TYPE-C connector 26B and determines the settings of the USB port. The USBPD controller 81 also controls the FET 64, FET 65, FET 66, and FET 67 to control the power supply to devices connected to the USB Type-C connectors (26A, 26B).

The USBPD controller 81 is supplied with operating power from the 5V DC/DC power circuit 405 and the 3.3V DC/DC power circuit 406.

The USB Type-A charger 82 generates charging power for the USB Type-A port. The USB Type-A charger 82 is supplied with operating power from the 5V DC/DC power circuit 405.

For instance, the TBT Retimer 83 is a Thunderbolt Retimer IC, and stores setting information of the devices connected to the USB Type-C connectors (26A, 26B). The TBT Retimer 83 is supplied with operating power from the 3.3V DC/DC power circuit 406.

The components in group G2 (second component) are a second group of components among the multiple components, and are not related to the external power supply.

In one or more embodiments, the group G2 components include the audio system 24, the WLAN module 25, the SoC unit 27, a sensor unit 71, and a TPM 72.

The sensor unit 71 includes different types of sensors and is supplied with operating power from the 1.8V DC/DC power circuit 407.

For instance, the TPM 72 is a security chip that complies with the trusted platform module (TPM) 2.0 specifications, and generates and manages passwords, encryption keys, security certificates, and others. The TPM 72 is supplied with operating power from the 1.8V DC/DC power circuit 407.

The audio system 24 is supplied with operating power from the 1.8V DC/DC power circuit 407.

The WLAN module 25 is supplied with operating power from the 3.3V DC/DC power circuit 406 via the load switch unit 61.

The SoC unit 27 is supplied with operating power from the 3.3V DC/DC power circuit 406 via the load switch unit 61, and is also supplied with operating power from the 1.8V DC/DC power circuit 407 and the other DC/DC power circuit 408.

The SoC unit 27 is also supplied with operating power from the LDO 409 or the coin battery 410 via diodes 62 and 63.

The SoC unit 27 includes a BIOS setup menu information storage 271, an ACPI timer 272, and an RTC timer 273.

For instance, the BIOS setup menu information storage 271 may be a memory unit that includes a RAM (not illustrated) of the SoC unit 27. The BIOS setup menu information storage 271 stores setting information (e.g., wake-up event settings) set through the BIOS setup menu.

The ACPI (Advanced Configuration and Power Interface) timer 272 is a timer for power management, and is used to return from a power-down state such as a shutdown state.

The RTC (Real Time Clock) timer 273 is a timer with a real-time clock, and is used to return from a power-down state such as a shutdown state. The RTC timer 273 operates with power supplied from the LDO 409 or coin cell battery 410.

The load switch unit 61 (an example of a switch unit) is connected between the power circuit unit 40 and the group G2 components (e.g., WLAN module 25 and SoC unit 27), and is capable of switching between supplying and stopping the operating power supplied from the power circuit unit 40 to the group G2 components. Receiving a control signal S2 from the embedded controller 31, the load switch unit 61 performs switching between supplying and stopping the operating power supplied from the power circuit unit 40.

The WLAN module 25 and SoC unit 27 are supplied with operating power from the 3.3V DC/DC power circuit 406 of the power circuit unit 40 via the load switch unit 61.

The audio system 24, the SoC unit 27, the sensor unit 71, and the TPM 72 are supplied with operating power directly from the 1.8V DC/DC power circuit 407 of the power circuit unit 40.

The group G2 components include group G3 components (audio system 24, SoC unit 27, sensor unit 71, and TPM 72) that are supplied with operating power directly from the power circuit unit 40.

The main controller 10 is a functional unit implemented by causing the CPU 11 and chipset 21 to execute programs stored in the BIOS memory 22 and the HDD 23, and executes various types of information processing of the laptop PC 1 based on the BIOS or OS.

The main controller 10 includes an OS processor 101 and a BIOS processor 102.

The OS processor 101 is a functional unit implemented by causing the CPU 11 and chipset 21 to execute OS programs stored in the HDD 23, and executes processing based on the OS (e.g., Windows (registered trademark)).

The BIOS processor 102 is a functional unit implemented by causing the CPU 11 and chipset 21 to execute BIOS programs stored in the BIOS memory 22, and executes BIOS processing.

When transitioning to a shutdown state, the BIOS processor 102 checks the setting information in the BIOS setup menu information storage 271 of the SoC unit 27. If a wake-up event (return event) is set, the BIOS processor 102 stores "1", for example, in a state information storage 311 of the embedded controller 31 described later.

When transitioning to a shutdown state, the BIOS processor 102 checks the setting information in the BIOS setup menu information storage 271 of the SoC unit 27. If no wake-up event (return event) is set, the BIOS processor 102 stores "0", for example, in the state information storage 311 of the embedded controller 31 described later.

The embedded controller 31 is operable with the power supply to the main controller 10 stopped, and is supplied with operating power from the LDO 404. The embedded controller 31 uses a control signal S1 (first control signal) to execute the control of switching between supplying and stopping the operating power supplied from the power circuit unit 40 (e.g., the 5V DC/DC power circuit 405 and the 3.3 V DC/DC power circuit 406), and uses a control signal S2 (second control signal) to execute the control of switching between supplying and stopping of the operating power via the load switch unit 61. The embedded controller 31 also uses a control signal S2 to execute switching between supplying and stopping of the operating power from the 1.8V DC/DC power circuit 407 and the other DC/DC power circuit 408 of the power circuit unit 40.

In an ECO shutdown (second shutdown state) that consumes less power than a normal shutdown (first shutdown state), which is the normal shutdown state, the embedded controller 31 stops the power supply to the main controller 10, uses a control signal S1 to supply operating power from the power circuit unit 40 to the group G1 components, and uses a control signal S2 to stop the supply of operating power to the group G2 components (e.g., the WLAN module 25 and the SoC unit 27) via the load switch unit 61.

In the ECO shutdown, the embedded controller 31 uses a control signal S2 to stop the supply of operating power to the group G3 components (audio system 24, SoC unit 27, sensor unit 71, and TPM 72) among the group G2 components.

In the normal shutdown, the embedded controller 31 stops the power supply to the main controller 10, uses a control signal S1 to supply operating power from the power circuit unit 40 to the group G1 components, and uses a control signal S2 to supply operating power via the load switch unit 61 to the group G2 components. That is, in the normal shutdown, the embedded controller 31 uses the control signals S1 and S2 to supply operating power to both group G1 and group G2 components.

Referring now to FIG. 3, the following describes the states of control signals in the normal shutdown and ECO shutdown.

FIG. 3 indicates one example of control signals in the shutdown states of the laptop PC 1 according to one or more embodiments.

As indicated in FIG. 3, the embedded controller 31 controls the control signals S1 and S2 to ON in the normal shutdown. The embedded controller 31 controls the control signal S1 to ON and the control signal S2 to OFF in the ECO shutdown.

Note that the embedded controller 31 controls the control signals S1 and S2 to OFF in a Moff state, which corresponds to the power-off state. For instance, the embedded controller 31 executes control to transition to the Moff state if the AC adapter 50 is not connected to the notebook PC 1 when the laptop PC 1 transitions to the shutdown state, or if the AC adaptor 50 is removed from the laptop PC 1 in the shutdown state.

FIG. 4 indicates one example of the states of the components when the laptop PC 1 according to one or more embodiments is shut down.

The embedded controller 31 performs the control indicated in FIG. 3, so that the states of the components are set as in FIG. 4.

As indicated in FIG. 4, in the normal shutdown, operating power is supplied to the SoC unit 27, WLAN module 25, audio system 24, TPM 72, sensor unit 71, USB Type-A charger 82, USB PD controller 81, and TBT Retimer 83, so that these components turn to an operable ON state (operating state).

In the ECO shutdown, no operating power is supplied to the SoC unit 27, WLAN module 25, audio system 24, TPM 72, and sensor unit 71, so that these components turn to an inoperable OFF state (stopping state). Operating power is supplied to the USB Type-A charger 82, USB PD controller 81, and TBT Retimer 83, so that these components turn to an operable ON state (operating state).

In the ECO shutdown, the USB Type-A charger 82, USBPD controller 81, and TBTRetimer 83 are operable ON (operating state), meaning that power (e.g., charging power) is suppliable to a device connected to the USB connector 26, for example.

Referring back to FIG. 2, when transitioning to the shutdown state, the embedded controller 31 executes control to transition to the normal shutdown if a return event from the shutdown state is set; and executes control to transition to the ECO shutdown if no return event is set. Here, the return events include an RTC timer wake, an ACPI timer wake, a USB wake, a wake by LAN, a wake by WLAN, and a wake by the embedded controller (EC) 31.

The embedded controller 31 includes the state information storage 311.

The state information storage 311 stores state information indicating whether a normal shutdown or an ECO shutdown is to be executed. For instance, the state information storage 311 is one bit of an interface register in the embedded controller 31, in which "1" is stored when a normal shutdown is to be executed, and "0" is stored when an ECO shutdown is to be executed.

For instance, the embedded controller 31 executes control to transition to either normal shutdown or ECO shutdown, in accordance with the state information stored in the state information storage 311. Specifically, when "1" is stored in the state information storage 311, the embedded controller 31 executes control to transition to normal shutdown. When "0" is stored in the state information storage 311, the embedded controller 31 executes control to transition to ECO shutdown.

When "0" is stored in the state information storage 311 and the management engine (ME) function is in the M3 state, the embedded controller 31 controls to transition to normal shutdown.

Referring now to FIG. 5, the following describes additional functions (optional functions) of the laptop PC 1 in the shutdown states according to one or more embodiments.

FIG. 5 indicates one example of the additional functions of the laptop PC 1 in the shutdown states according to one or more embodiments.

As indicated in FIG. 5, the laptop PC 1 in the normal shutdown is allowed to use additional functions (optional functions), including the ME function (M3 state), RTC timer wake-up, ACPI timer wake-up, USB wake-up, wake-up by LAN, wake-up by WLAN, wake-up by embedded controller 31 (EC), and charging via the USB port.

The laptop PC 1 in the ECO shutdown is not allowed to use additional functions (optional functions) of the ME function (M3 state), RTC timer wake-up, ACPI timer wake-up, USB wake-up, wake-up by LAN, and wake-up by WLAN. The laptop PC 1 in the ECO shutdown is allowed to use additional functions (optional functions), including the wake-up by embedded controller 31 (EC), and charging via the USB port.

Referring next to the drawings, the following describes the operation of the laptop PC 1 according to one or more embodiments.

Figure 6:
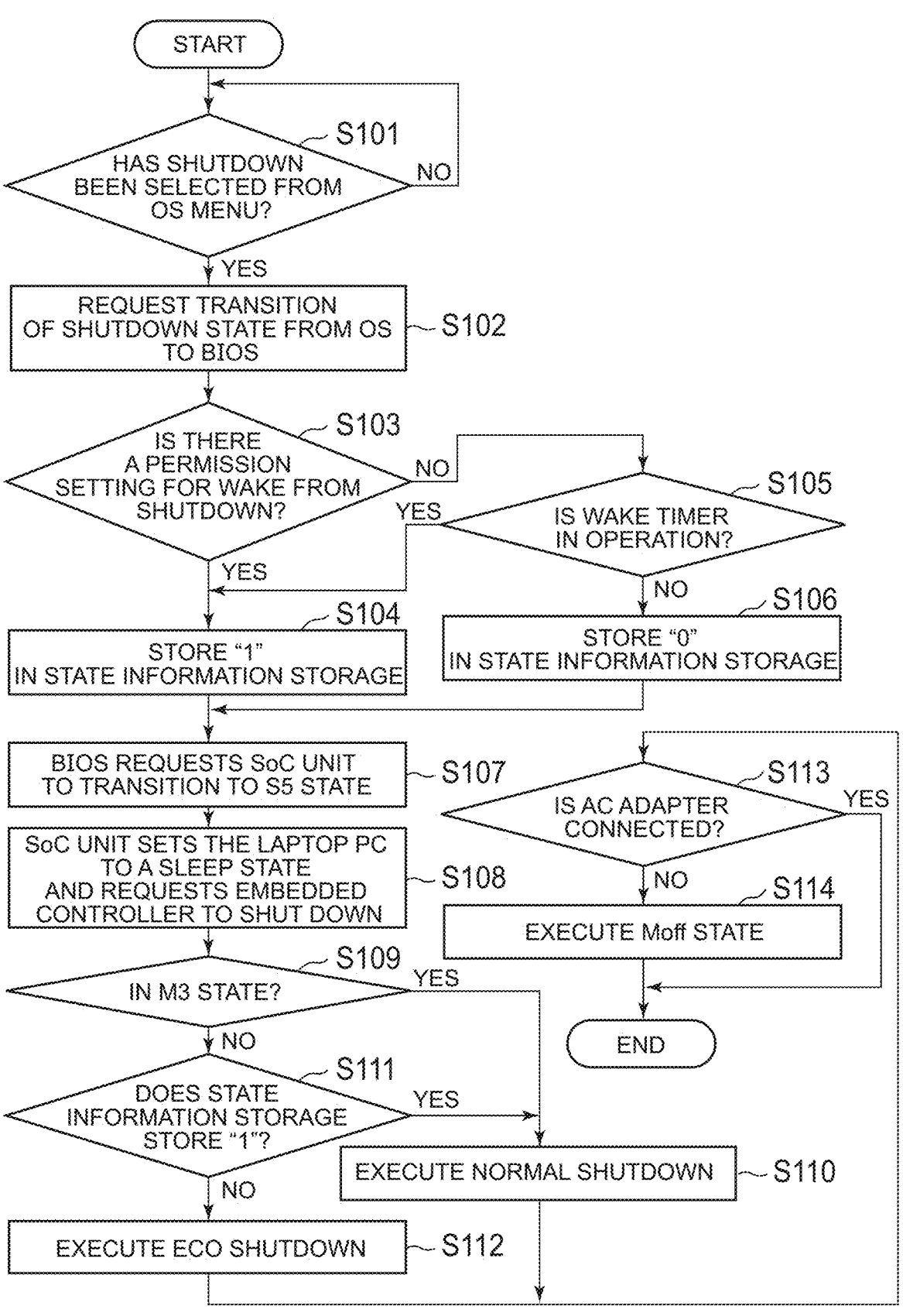
FIG. 6 is a flowchart illustrating one example of the operation of the laptop PC according to one or more embodiments.

FIG. 6 is a flowchart illustrating one example of the operation of the laptop PC 1 according to one or more embodiments.

Referring to FIG. 6, the following describes the operation of the laptop PC 1 when it transitions to a shutdown state.

As illustrated in FIG. 6, the main controller 10 of the laptop PC 1 determines whether shutdown has been selected from the OS menu (step S101). The OS processor 101 of the main controller 10 determines whether the user has selected shutdown from the OS menu (has requested to transition to shutdown). If shutdown has been selected (step S101: YES), the OS processor 101 advances the process to step S102. If shutdown has not been selected (step S101: NO), the OS processor 101 returns the process to step S101.

In step S102, the OS processor 101 requests a transition of the shutdown state from the OS to the BIOS in response to the shutdown transition request. The OS processor 101 requests the BIOS processor 102 to process the transition to the shutdown state.

Next, the BIOS processor 102 determines whether there is a permission setting for wake from shutdown (step S103). The BIOS processor 102 checks the BIOS setup menu information storage 271 of the SoC unit 27 to determine whether the menu information has a wake permission setting (permission setting for return event). If it has a wake permission setting (permission setting for return event) (step S103: YES), the BIOS processor 102 advances the process to step S104. If it does not have a wake permission setting (permission setting for return event) (step S103: NO), the BIOS processor 102 advances the process to step S105.

In step S104, the BIOS processor 102 stores "1" in the state information storage 311. That is, the BIOS processor 102 stores "1" in the state information storage 311 that is an interface register of the embedded controller 31. After the process in step S104, the BIOS processor 102 advances the process to step S107.

In step S105, the BIOS processor 102 determines whether the wake timer is in operation. The BIOS processor 102 checks the SoC unit 27 to determine whether the RTC timer 273 or ACPI timer 272 is in operation. If the wake timer is in operation (step S105: YES), the BIOS processor 102 advances the process to step S104. If the wake timer is not in operation (step S105: NO), the BIOS processor 102 advances the process to step S106.

In step S106, the BIOS processor 102 stores "0" in the state information storage 311. After the process in step S106, the BIOS processor 102 advances the process to step S107.

In step S107, the BIOS requests the SoC unit 27 to transition to the S5 state. That is, the BIOS processor 102 requests the SoC unit 27 to transition to the S5 state (shutdown state).

Next, the SoC unit 27 sets the laptop PC 1 to a sleep state and requests the embedded controller 31 to shut down (step S108). For instance, the SoC unit 27 executes control to stop supplying operating power to the main parts of the main controller 10 by setting the sleep signals (SLP_S3 #and SLP_S4 #) to Low, and requests the embedded controller 31 to transition to the shutdown state.

Next, the embedded controller 31 determines whether it is in M3 state (step S109). The embedded controller 31 determines whether the signal of SLP_A #, which indicates that the ME function is in M3 state, is High. If it is in M3 state (step S109: YES), the embedded controller 31 advances the process to step S110. If it is not in M3 state (step S109: NO), the embedded controller 31 advances the process to step S111.

In step S110, the embedded controller 31 executes a normal shutdown. That is, the embedded controller 31 controls the control signal S1 to High that turns the power supply ON, and controls the control signal S2 to High that turns the power supply ON. After the process in step S110, the embedded controller 31 advances the process to step S113.

In step S111, the embedded controller 31 determines whether the state information storage 311 stores "1". If "1" is stored in the state information storage 311 (step S111: YES), the embedded controller 31 advances the process to step S110. If "0" is stored in the state information storage 311 (step S111: NO), the embedded controller 31 advances the process to step S112.

In step S112, the embedded controller 31 executes an ECO shutdown. That is, the embedded controller 31 controls the control signal S1 to High that turns the power supply ON, and controls the control signal S2 to Low that turns the power supply OFF. After the process in step S112, the embedded controller 31 advances the process to step S113.

In step S113, the embedded controller 31 determines whether the AC adapter 50 is being connected. If the AC adapter 50 is connected (step S113: YES), the embedded controller 31 advances the process to step S114. If the AC adapter 50 is not connected (step S113: NO), the embedded controller 31 ends the transition process to shutdown state.

In step S114, the embedded controller 31 executes a Moff state. That is, the embedded controller 31 controls the control signal S1 to Low that turns the power supply OFF, and controls the control signal S2 to Low that turns the power supply OFF. After the process in step S114, the embedded controller 31 ends the transition process to shutdown state.

As described above, the laptop PC 1 (information processing apparatus) according to one or more embodiments includes the plurality of components, the power supply unit 40, the group G1 components (first component), the group G2 components (second component), the load switch unit 61 (switch unit), and the embedded controller 31 (sub-controller). The power circuit unit 40 is capable of switching between supplying and stopping the operating power to the components. In the plurality of components, the group G1 components (e.g., the USBPD controller 81, USB Type-A charger 82, and the TBT Retimer 83) are related to the external power supply, and are supplied with operating power directly from the power circuit unit 40. In the plurality of components, the group G2 components (e.g., the WLAN module 25 and SoC unit 27) are not related to the external power supply. The load switch unit 61 is connected between the power circuit unit 40 and the group G2 components, and is capable of switching between supplying and stopping the operating power supplied from the power circuit unit 40 to the group G2 components. The embedded controller 31 is operable with the power supply to the main controller 10, which executes information processing based on the OS, stopped. Then, the embedded controller 31 uses a control signal S1 (first control signal) to execute the control of switching between supplying and stopping the operating power supplied from the power circuit unit 40, and uses a control signal S2 (second control signal) to execute the control of switching between supplying and stopping of the operating power via the load switch unit 61.

This allows the laptop PC 1 (information processing apparatus) of one or more embodiments to stop supplying operating power to the group G2 components via the load switch unit 61 while supplying operating power to the group G1 components (first component) related to the external power supply. Thus, the laptop PC 1 according to one or more embodiments achieves a shutdown state (ECO shutdown) with less current consumption than the normal shutdown state, thereby enabling power saving.

The laptop PC 1 according to one or more embodiments includes the load switch unit 61 added to the conventional configuration and thus controls the power consumption using a control signal S2 from the embedded controller 31. The laptop PC 1 therefore enables a shutdown state (ECO shutdown) that consumes even less current than the normal shutdown state.

In the ECO shutdown (second shutdown state) that consumes less power than the normal shutdown (first shutdown state), which is the normal shutdown state, the embedded controller 31 of one or more embodiments stops the power supply to the main controller 10, uses a control signal S1 to supply operating power from the power circuit unit 40 to the group G1 components, and uses a control signal S2 to stop the supply of operating power to the group G2 components via the load switch unit 61.

In this way, the laptop PC 1 according to one or more embodiments enables the ECO shutdown (second shutdown state) with a large power-saving effect by a simple control using the two control signals, S1 and S2.

In the normal shutdown, the embedded controller 31 of one or more embodiments stops the power supply to the main controller 10, uses a control signal S1 to supply operating power from the power circuit unit 40 to the group G1 components, and uses a control signal S2 to supply operating power via the load switch unit 61 to the group G2 components.

This allows the laptop PC 1 of one or more embodiments to operate while switching to normal shutdown (first shutdown state) from ECO shutdown (second shutdown state).

When transitioning to the shutdown state, the embedded controller 31 of one or more embodiments executes control to transition to the normal shutdown if a return event from the shutdown state is set; and executes control to transition to the ECO shutdown if no return event is set.

This allows the laptop PC 1 of one or more embodiments to transition to the normal shutdown if a return event is set, meaning that the laptop PC 1 is capable of supporting the ECO shutdown, while switching to the normal shutdown, to which it returns in response to the set return event.

The laptop PC 1 according to one or more embodiments includes the state information storage 311 that stores state information indicating whether a normal shutdown or an ECO shutdown is to be executed. In response to a request to transition to the shutdown state, the main controller 10 determines whether a return event is set or not, and stores the state information in the state information storage 311 based on the result of the determination. The embedded controller 31 executes control to transition to either the normal shutdown or ECO shutdown in accordance with the state information (e.g., "1" or "0") stored in the state information storage 311.

This allows the laptop PC 1 according to one or more embodiments to properly switch between normal shutdown and ECO shutdown by the simple method of using the state information storage 311 in the embedded controller 31.

In one or more embodiments, the group G1 components include a component to operate the USB.

This allows the laptop PC 1 according to one or more embodiments to enable ECO shutdown, which is more power-efficient than normal shutdown, with USB in operation.

A control method according to one or more embodiments controls a laptop PC 1 that includes the plurality of components, the power supply unit 40, the group G1 components (first component), the group G2 components (second component), the load switch unit 61 (switch unit), and the embedded controller 31 (sub-controller), and the method includes a control step. The power circuit unit 40 is capable of switching between supplying and stopping the operating power to the plurality of components. In the plurality of components, the group G1 components (e.g., the USBPD controller 81, USB Type-A charger 82, and the TBT Retimer 83) are related to the external power supply, and are supplied with operating power directly from the power circuit unit 40. In the plurality of components, the group G2 components (e.g., the WLAN module 25 and SoC unit 27) are not related to the external power supply. The load switch unit 61 is connected between the power circuit unit 40 and the group G2 components, and is capable of switching between supplying and stopping the operating power supplied from the power circuit unit 40 to the group G2 components. The embedded controller 31 is operable with the power supply to the main controller 10, which executes information processing based on the OS, stopped. In the control step, the embedded controller 31 uses a control signal S1 to execute the control of switching between supplying and stopping the operating power supplied from the power circuit unit 40, and uses a control signal S2 to execute the control of switching between supplying and stopping of the operating power via the load switch unit 61.

Thus, the control method according to one or more embodiments has a similar effect to that from the laptop PC 1 as described above, and achieves a shutdown state (ECO shutdown) with less current consumption than the normal shutdown state, thereby enabling power saving.

The present invention is not limited to the above-described embodiments, and can be modified without deviating from the scope of the present invention.

For instance, one or more embodiments describe the example where the information processing apparatus is the laptop PC1. The present invention is not limited to this, and the information processing apparatus may be another information processing apparatus, such as a tablet terminal or a desktop PC.

One or more embodiments describe a component related to USB as an example of the group G1 components that are related to the external power supply. The present invention is not limited to this, and components related to another interface (another I/O) may be used as the group G1 components (first component).

One or more embodiments describe an example of the load switch unit 61 that is inserted in the output line from the 3.3V DC/DC power circuit 406. The present invention is not limited to this, and the load switch unit 61 may be inserted into another power circuit unit.

One or more embodiments describe an example of the laptop PC 1 having a single load switch unit 61. The present invention is not limited this, and may include a plurality of load switch units 61.

One or more embodiments describe an example of the AC adapter 50 connected to the USB Type-C connector 26A. The present invention is not limited to this. The AC adapter 50 may be connected to a dedicated power supply port, or may be connected to a port of another interface.

The above-stated configuration of the laptop PC 1 internally includes a computer system. A program to implement the functions of the configuration of the laptop PC 1 as stated above may be stored in a computer-readable recording medium, and the processing at the configuration of the laptop PC 1 may be performed by causing the computer system to read and execute the program stored in this recording medium. "Causing the computer system to read and execute the program stored in the recording medium" includes installing of such a program in the computer system. The "computer system" here includes an OS and hardware, such as peripherals.

The "computer system" may include a plurality of computer apparatuses connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the laptop PC 1. Alternatively, different distribution servers may distribute these divided pieces of program.

The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions as stated above may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

The present invention is not limited to the embodiments described above, and changes can be made freely without departing from the gist of the present invention.

DESCRIPTION OF SYMBOLS

1 laptop PC
10 main controller
11 CPU
12 main memory
13 video subsystem
14 display unit
21 chipset
22 BIOS memory
23 HDD
24 audio system
25 WLAN module
26, 26A, 26B USB connector
27 SoC unit
31 embedded controller (EC)
32 input unit
33 power supply
40 power circuit unit
50 AC adapter
61 load switch unit
62, 63 diode
64, 65, 66, 67, 403 FET
71 sensor unit
72 TPM
81 USBPD controller
82 USB TYPE-A charger
83 TBTR timer
101 OS processor
102 BIOS processor
271 BIOS setup menu information storage
272 ACPT timer
273 RTC timer
311 state information storage

401 battery
402 buck-boost charger
404, 409 LDO
405 5V DC/DC power circuit
406 3.3V DC/DC power circuit
407 1.8V DC/DC power circuit
408 another DC/DC power circuit
410 coin battery

What is claimed is:

1. An information processing apparatus including a plurality of components, comprising:
    a power circuit unit capable of switching between supplying and stopping operating power to the plurality of components;
    a first component of the plurality of components, the first component being related to external power supply, and being supplied with operating power directly from the power circuit unit;
    a second component of the plurality of components, the second component being not related to the external power supply;
    a switch unit connected between the power circuit unit and the second component, the switch unit being capable of switching between supplying and stopping the operating power supplied from the power circuit unit to the second component;
    a main controller that executes information processing based on an operating system (OS);
    a sub-controller that is operable when the main controller is not supplied with operating power; and
    a basic input output system (BIOS) memory configured to store setting information for a wake-up event, wherein
    the sub-controller uses a first control signal to execute control of switching between supplying and stopping the operating power supplied from the power circuit unit,
    the sub-controller uses a second control signal to execute control of switching between supplying and stopping of the operating power via the switch unit,
    the information processing apparatus is configured with a first shutdown state that is a normal shutdown state and a second shutdown state that consumes less power than the first shutdown state, and
    when transitioning to a shutdown state, the sub-controller
        executes control to transition to the first shutdown state if the setting information for the wake-up event is stored in the BIOS memory, and
        executes control to transition to the second shutdown state if the setting information for the wake-up event is not stored in the BIOS memory.

2. The information processing apparatus according to claim 1, wherein
    in the second shutdown state, the sub-controller stops power supply to the main controller, uses the first control signal to supply the operating power from the power circuit unit to the first component, and uses the second control signal to stop supply of the operating power to the second component via the switch unit.

3. The information processing apparatus according to claim 2, wherein
    in the first shutdown state, the sub-controller stops power supply to the main controller, uses the first control signal to supply the operating power from the power circuit unit to the first component, and uses the second control signal to supply the operating power to the second component via the switch unit.

4. The information processing apparatus according to claim 1,
    wherein the sub-controller includes a state information storage that stores state information indicating whether the first shutdown state or the second shutdown state is to be executed,
    in response to a request to transition to a shutdown state, the main controller makes a determination whether or not the setting information for the wake-up event is stored in the BIOS memory, and stores the state information in the state information storage based on a result of the determination, and
    the sub-controller executes control to transition to either the first shutdown state or the second shutdown state in accordance with the state information stored in the state information storage.

5. The information processing apparatus according to claim 1, wherein the first component includes a component to operate a universal serial bus (USB).

6. A method for controlling an information processing apparatus including a plurality of components, and including a power circuit unit capable of switching between supplying and stopping operating power to the plurality of components; a first component of the plurality of components, the first component being related to external power supply, and being supplied with operating power directly from the power circuit unit; a second component of the plurality of components, the second component being not related to the external power supply; a switch unit connected between the power circuit unit and the second component, the switch unit being capable of switching between supplying and stopping the operating power supplied from the power circuit unit to the second component; a main controller that executes information processing based on an operating system (OS); a sub-controller that is operable when the main controller is not supplied with operating power; and a basic input output system (BIOS) memory configured to store setting information for a wake-up event, the method comprising:
    when transitioning to a shutdown state selected from a first shutdown state that is a normal shutdown state and a second shutdown state that consumes less power than the first shutdown state,
        executing, by the sub-controller, control to transition to the first shutdown state if the setting information for the wake-up event is stored in the BIOS memory, and
        executing, by the sub-controller, control to transition to the second shutdown state if the setting information for the wake-up event is not stored in the BIOS memory, wherein
    the sub-controller uses a first control signal to execute control of switching between supplying and stopping the operating power supplied from the power circuit unit, and
    the sub-controller uses a second control signal to execute control of switching between supplying and stopping of the operating power via the switch unit.

* * * * *